Fig. 1

INVENTORS
Alfred J. Thelen
Nils H. Bergfelt
Eugene A. Eufusia
Attorneys

INVENTORS
Alfred J. Thelen
Nils H. Bergfelt
Eugene A. Eufusia

Attorneys

May 14, 1968  A. J. THELEN ET AL  3,382,843
VACUUM COATING APPARATUS UTILIZING ROTATING SOURCES
Filed Oct. 23, 1965  7 Sheets-Sheet 6

INVENTORS
Alfred J. Thelen
Nils H. Bergfelt
Eugene A. Eufusia

Attorneys

United States Patent Office 3,382,843
Patented May 14, 1968

3,382,843
VACUUM COATING APPARATUS UTILIZING ROTATING SOURCES
Alfred J. Thelen, Nils H. Bergfelt, and Eugene A. Eufusia, Santa Rosa, Calif., assignors to Optical Coating Laboratory, Inc., Santa Rosa, Calif., a corporation of California
Filed Oct. 23, 1965, Ser. No. 503,116
10 Claims. (Cl. 118—49.1)

ABSTRACT OF THE DISCLOSURE

Vacuum coating apparatus having rotating sources with water cooled conductors and having remotely controlled shielding means carried with the sources and operable as the sources are rotated.

---

This invention relates to a vacuum coating apparatus and more particularly to a vacuum coating apparatus utilizing rotating sources.

In the past, it has been conventional to utilize a stationary source or sources and to deposit the coating upon substrates carried by a rotating holder or rack. The holders or racks have been rotated in order to obtain greater uniformity in the coating. Apparatus utilizing double rotation to achieve greater uniformity is disclosed in U.S. Letters Patent No. 3,128,205. However, in such vacuum coating apparatus, it has been found that the speed of rotation is limited and that it is necessary to clamp the substrates to the holder. In addition, it has been found that rotation of the holder introduces chatter and vibration which affects the quality of the coating. There is, therefore, a need for a new and improved apparatus for vacuum coating.

In general, it is an object of the present invention to provide an apparatus for vacuum coating which eliminates the necessity for rotating a substrate while a coating is being evaporated upon it.

Another object of the invention is to provide an apparatus of the above character in which the source material is rotated relative to the substrates to be coated.

Another object of the invention is to provide apparatus for vacuum coating of this above character in which the substrates can remain stationary, while still making it possible to obtain great uniformity in the coating deposited upon the substrates.

Another object of the invention is to provide an apparatus of the above character in which it is possible to utilize vacuum chambers having different configurations.

Another object of the invention is to provide an apparatus of the above character in which the entire chamber is available for depositing coatings.

Another object of the invention is to provide an apparatus of the above character in which the vapor source can be shielded immediately to precisely control the commencement and termination of the coating process.

Another object of the invention is to provide an apparatus of the above character in which the shields are utilized for covering the sources and in which the shields can be operated from outside the vacuum chamber.

Another object of the invention is to provide an apparatus of the above character which is relatively simple to manufacture.

Additional objects and features of the invention will appear from the following description in which the preferred embodiment is set forth in detail in conjunction with the accompanying drawings.

Referring to the drawings.

In general, the vacuum coating apparatus consists of a vacuum chamber. A rack is mounted in a fixed position within the chamber and carries the substrates to be coated. At least one source of coating material is provided in the chamber. Means is mounted in the chamber for rotating the source within the chamber. Means external of the machine and connected to the source is provided for supplying heat to the source.

Figure 1:
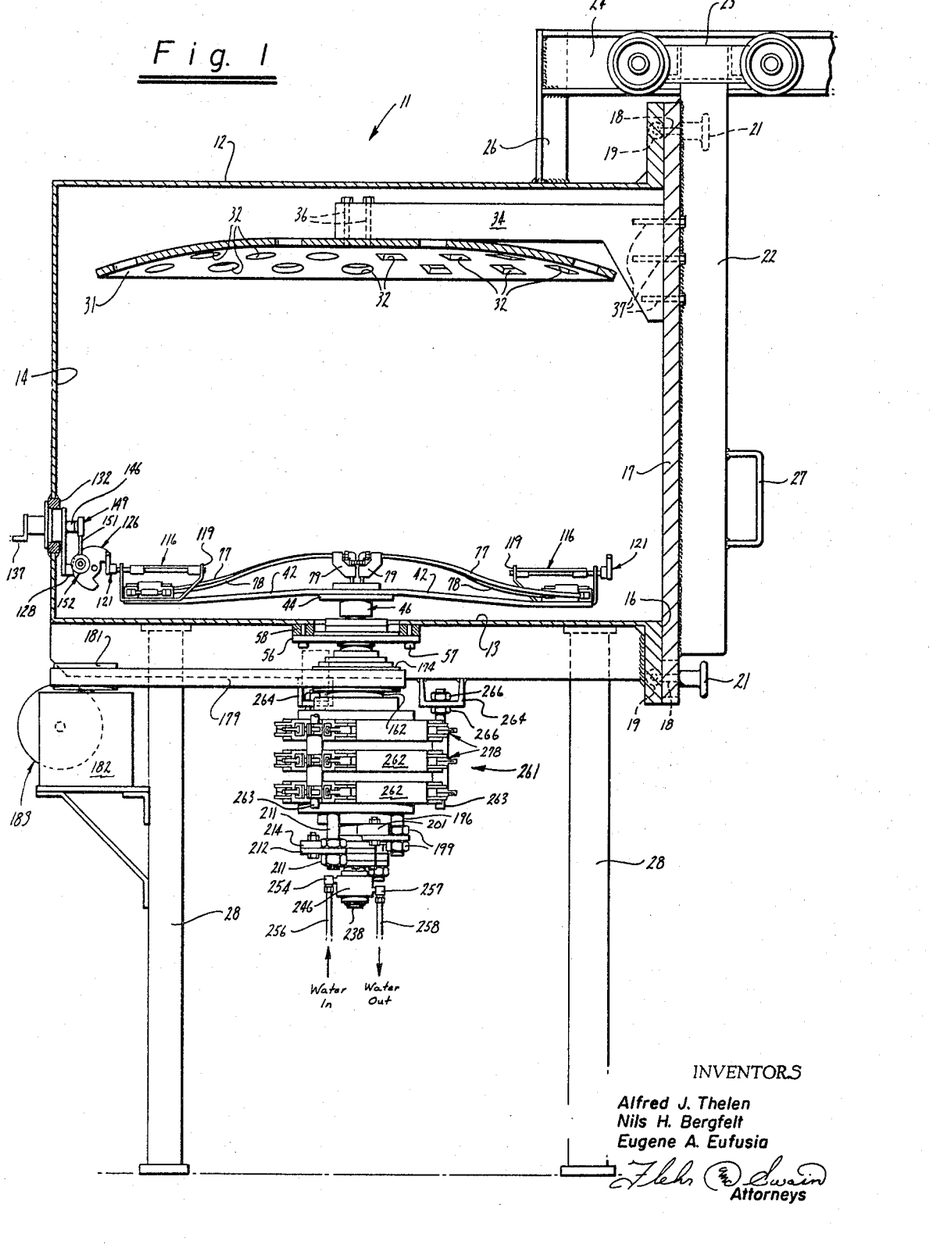
FIGURE 1 is a side elevational view in cross-section of a vacuum coating apparatus incorporating the present invention.

As shown in the drawing, the vacuum coating apparatus consists of a large vacuum chamber 11 which is formed by substantially planar top and bottom walls 12 and 13 and a U-shaped side wall 14. The chamber is provided with a large front opening 16. The opening 16 is adapted to be closed by door 17 which is held in place by suitable means such as threaded rods 18 pivotally mounted on the chamber at 19 and hand nuts 21 which are threaded onto the rods 18. The door 17 is also supported in a suitable manner so that it can be readily moved to an open position. Thus, as shown, it is carried by a pair of bars 22 affixed to opposite sides of the door 17 and supported by a two-wheeled carriage 23 which rides in a track 24 supported by standards 26 mounted upon the chamber 11. Hand grips 27 are provided on the bars 22 to facilitate opening and closing of the door 17. The vacuum chamber 11 is supported at a suitable working height by spaced vertical legs 28.

A substrate holder in the form of a rack 31 is provided in the chamber. The rack is of a conventional type and, as shown, may be dish-shaped. It is provided with a plurality of openings 32 of various shapes and sizes which are formed so that substrates (not shown) may be positioned on the rack over the openings to receive a coating as hereinafter described. The rack 31 is supported in the chamber 11 in a suitable manner such as by an arm 34 and cap screws 36. The arm 34 is secured to the door 17 by cap screws 37. As can be seen, the rack 31 moves with the door and when the door is moved to an open position, the rack facilitates readily loading and unloading of the same.

At least one source of material for carrying out the coating operations is provided within the chamber 11. Thus, for this purpose, there is provided a pair of boats 40, each of which is provided with a depressed pocket 41 for receiving the coating material. The boats 40 are carried on the outer ends of a pair of arms 42. The inner ends of the arms 42 are secured by cap screws 43 on a flange 44 provided on a hub 46. The hub 46 is provided with a cut 47 so that the lower extremity of the hub can be secured to a hollow shaft 48 by a cap screw 49. The hub 46 is also secured to the shaft 48 by a key 51.

Figure 2A:
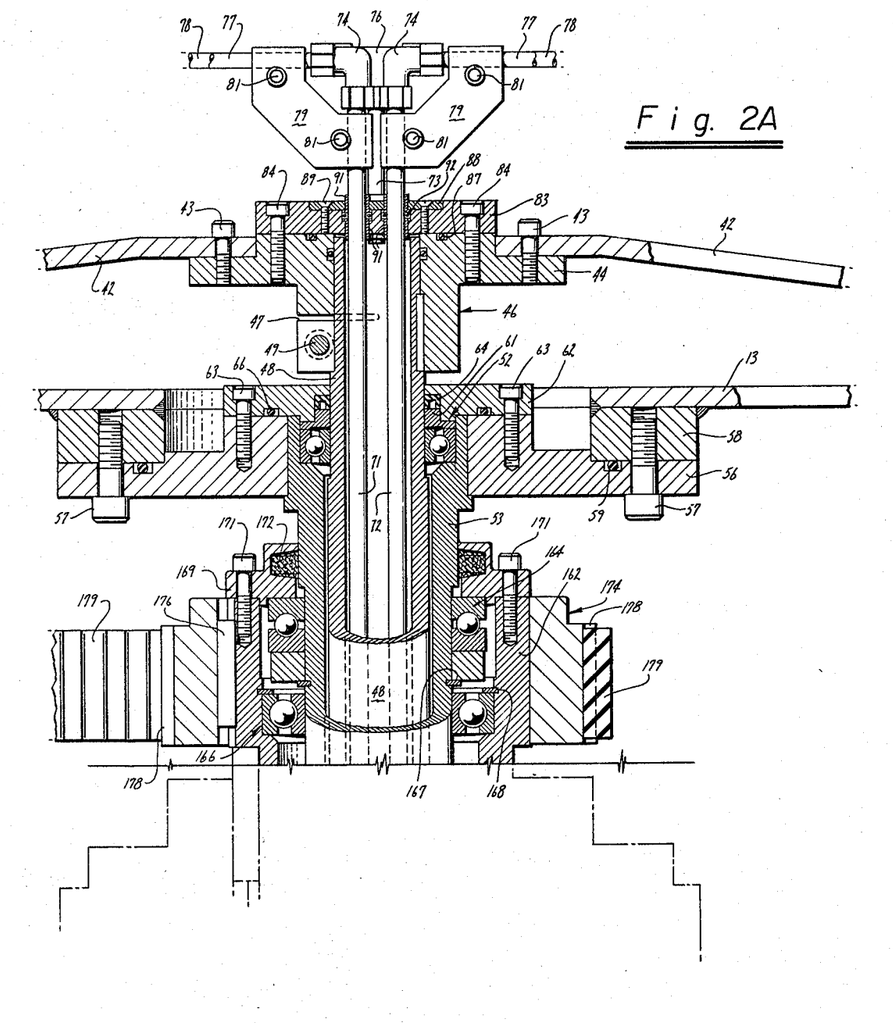
FIGURES 2A and 2B are cross-sectional view portions of the apparatus shown in FIGURE 1 utilized for rotating the sources.

As can be seen from FIGURE 2A, the upper end of the shaft 48 is rotatably mounted in the bottom wall 13 and is mounted in an upper ball bearing assembly 52 carried by the upper end of a stationary sleeve 53. A stationary flange 56 is mounted upon the upper extremity of the sleeve 53 and is secured by cap screws 57 to a ring 58 mounted upon the bottom wall 13 of the chamber. An O-ring 59 forms a seal between the flange 56 and the ring 58. A retaining ring 61 is mounted within the upper end of the sleeve 53 and serves to hold the ball bearing assembly 52 in place. A sealing plate 62 is provided for forming a seal between the shaft 48 and the flange 56. It is secured to the flange 56 by cap screws 63. A U-type seal 64 is disposed between the sealing plate 62 and the shaft 48 and an O-ring seal 66 is disposed between the sealing plate 62 and the flange 56.

Three separate pipes or tubes 71, 72, and 73 are disposed within the hollow shaft 48 and extend longitudinally thereof. As hereinafter described, these pipes or tubes 71, 72 and 73 serve as conductors of electricity as well as conduits for cooling fluid to keep the pipes or tubes cool. The pipes 71 and 72 are connected to right angle elbows 74 whereas the pipe 73 is connected to a T 76. The elbows 74 are also connected to laterally extending tubes 77 whereas the T 76 is connected to tubes 78. Clamps 79 (see FIGURE 2A) are secured about the tubes 71 and 72 and clamp the same to tubes 77 and 78 to ensure that a good electrical contact is made from the tubing 71 to the tubing 77 and from the tubing 72 to the tubing 78 without going through the elbows 74. The clamps 79 are secured to the tubing by cap screws 81. A large clamping plate 83 is secured to the hub 46 by cap screws 84. An O-ring 86 is provided between the plate 83 and the hub 46 and an additional O-ring 87 is provided between the hub 46 and the shaft 48. A sealing plate 88 is mounted in the clamping plate 83 and is secured thereto by screws 89.

Means is provided for insulating the tubes 71, 72 and 73 from the clamping plate 83 and the sealing plate 89 and consists of inserts 91 formed of a suitable material such as Teflon and which are provided with O-ring seals 92. In this way, the various tubes are isolated from each other and also from the hub 46.

The tubes 71, 72 and 73 and the tubes 77 and 78 are all formed of suitable conducting material such as copper. The tubes 77 are connected to elbows 93 which are connected to blocks 94 of suitable material, such as copper mounted on the outer ends of the arms 42. The blocks 94 are mounted upon insulating pads 96 carried by the arms 42 so that they are insulated from the arms 42. The blocks 94 are secured to the arms 42 by suitable means such as cap screws 97, formed of an insulating material.

Figure 6:
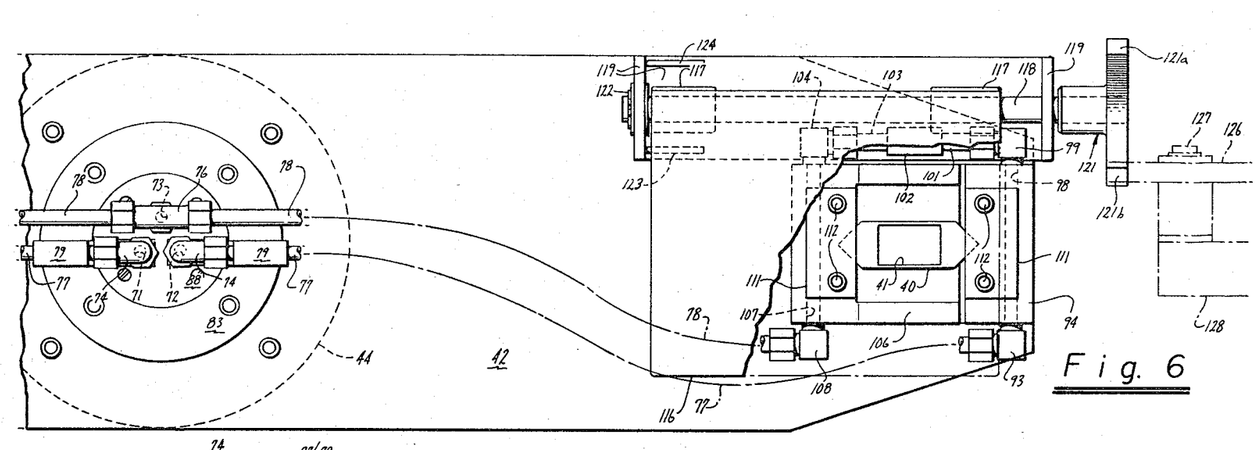
FIGURE 6 is a top plan view of another portion of the apparatus utilized for rotating the sources.
Figure 7:
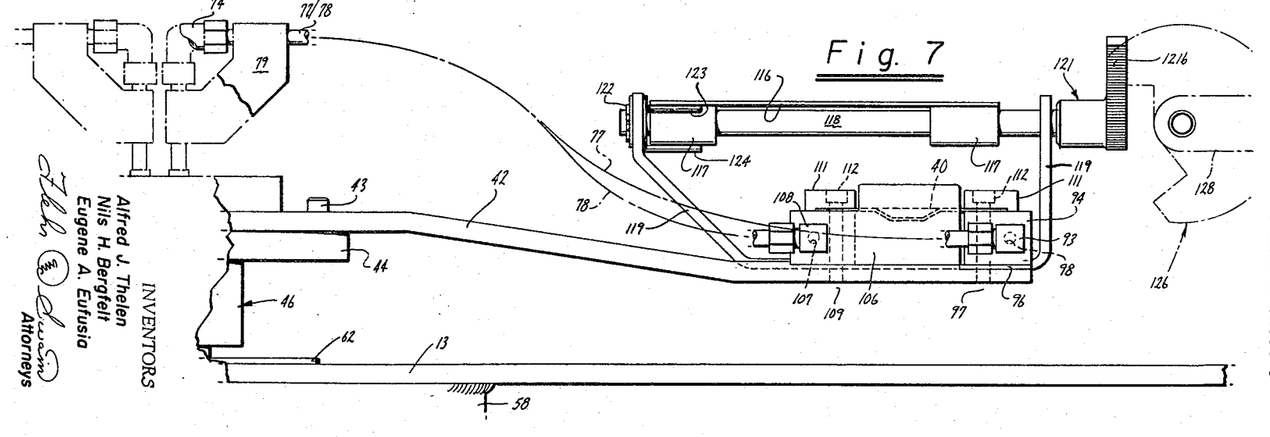
FIGURE 7 is a side elevational view of the portion of the apparatus shown in FIGURE 6.

The blocks 94 are provided with passages 98 which extend therethrough and communicate with elbows 99 mounted on the other ends of the blocks. The elbows 99 are connected to tubes 101 which extend into tubular insulators 102. The insulators 102 are connected to tubes 103 which are connected to elbows 104. The elbows 104 are mounted on U-shaped blocks 106 formed of a suitable material such as copper and communicate with passages 107 extending through the blocks. The passages 107 communicate with other elbows 108 mounted on the blocks 106 and are connected to the tubes 78. As can be seen from FIGURE 6, the U-shaped blocks 106 are secured to the outer ends of the arms 42 by cap screws 109. The U-shaped blocks are spaced from the blocks 94 so that they are not in electrical contact therewith. Means is provided for clamping the opposite ends of the boats 40 to the blocks 106 and 94 and consists of clamping plates 111 which are secured to the blocks 94 and 106 by cap screws 112. As can be seen from FIGURE 6, the opposite ends of the boats 40 are clamped to the blocks 94 and 96 which are insulated from each other so that current will flow through the boats 40 as hereinafter described to heat the source material placed in the boats to cause vapors to emanate therefrom.

Means is provided on each of the arms 42 for controlling the flow of vapors from the material in the boats 40 and consists of a cover plate or shield 116 secured to cylindrical members 117 which are affixed to a shaft 118. The shaft 118 is rotatably mounted in a substantially U-shaped bracket 119 mounted on the outer end of each of the arms 42. A yoke-like member 121 is mounted on one end of the shaft 118, whereas a retaining ring 122 is mounted upon the other end of the shaft 118 to retain the shaft within the bracket 119. As can be seen particularly from FIGURE 10, the yoke-like member 121 is provided with a pair of outwardly extending ears 121a and 121b to provide a substantially V-shaped member. A pair of stop pins 123 and 124 are mounted in the bracket 119. The stop pin 123 serves to retain the cover plate or shield 116 in a horizontal position when the cover plate 116 shields the substrates from the vapors emanating from the boats 40. The pin 124 serves to hold the plate 116 in a substantially horizontal position when it is in an out-of-the-way position.

Means is provided for moving the cover plate or shield 116 between the vapor blocking position and the out-of-the-way position and consists of a cam member 126 which is rotatably mounted upon a pin 127 carried by an L-shaped bracket 128. The bracket 128 is secured to a body 129 by cap screws 130. The body 129 is mounted in the wall 14 of the chamber 11 and is secured thereto by cap screws 131 threaded into a reinforcing member 132 secured to the wall 14. The cam member 126 is provided with a cut-out 133.

Figures 8, 9, 10:
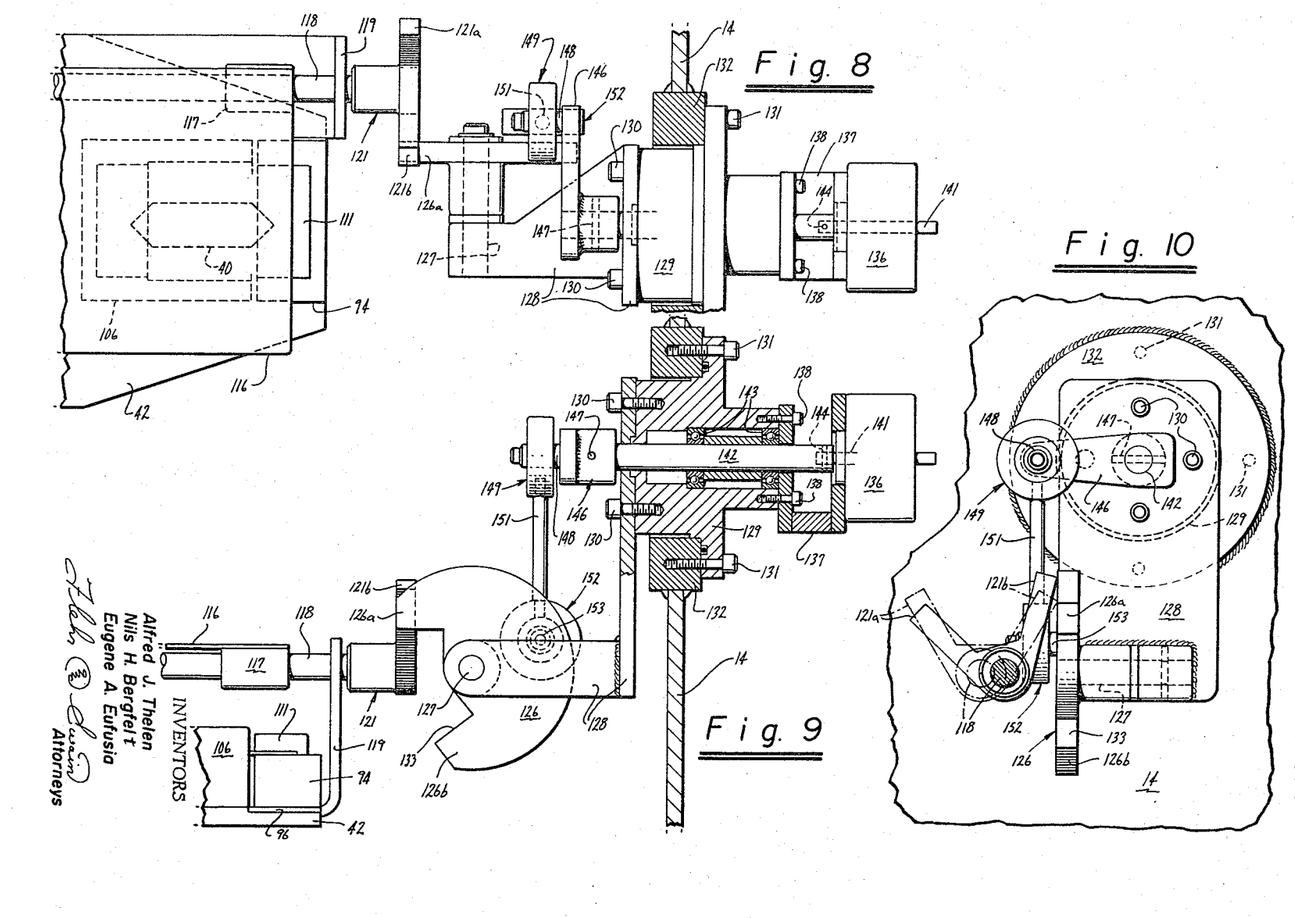
FIGURE 8 is a top plan view of one of the shields utilized in the apparatus together with the means for operating the shields.
FIGURE 9 is a side elevational view of the portion of the apparatus shown in FIGURE 8.
FIGURE 10 is an end elevational view of a portion of the apparatus as shown in FIGURES 8 and 9.

As hereinafter described, the cam member 126 is positioned to cause the cover plates or shields 116 to be moved to the proper positions during the coating operation. Means is provided for shifting the cam member 126 from one position in which it is adapted to engage the yoke-like member 121 to move the plates or shields 116 to prevent coating vapors emanating from the boat 40 making contact with the substrates and another position in which is adapted to engage the yoke-like member 121 to move the cover plate or shield 116 into an out-of-the-way position in which it permits the flow of coating vapors from the boats 40 to the substrates. As shown in FIGURES 8, 9 and 10 of the drawings, such means consists of a rotary solenoid 136 which is mounted upon a U-shaped bracket 137 secured to the fixture 129 by cap screws 138. The rotary solenoid 136 is provided with an output shaft 141 which rotates between two angular positions as, for example, two angular positions separated by 40°. The output shaft 141 is connected to a shaft 142 rotatably mounted in ball bearing assemblies 143 provided in the fixture 129. The connection between the shaft 141 and the shaft 142 is made in a suitable manner such as by means of pin 144 which extends diametrically through the same. An arm 146 is mounted on the other end of the shaft 142 and is connected thereto by pin 147. The arm 146 has a rod 148 mounted thereon. The rod 148 is provided with a spherical rod-end bearing assembly 149. A connecting rod 151 is threaded into the bearing assembly 149 and is threaded into another spherical rod-end bearing assembly 152. The rod-end bearing assembly 152 is connected to another rod 153 extending at right angles to the connecting rod 151 and is mounted in the cam member 126. From the construction shown, it can be seen that when the rotary solenoid 136 is operated, the cam member 126 can be moved to the position shown in FIGURES 8, 9 and 10. The portion 126a is adapted to be engaged by the yoke-like member 121 as the arm 146 is rotated in a clockwise direction as viewed in FIGURE 6 to cause the cover plate or shields 116 to be lifted from a position in which they prevent coating vapors from going upwardly from the boats 40 to an outof-the-way position 180° removed from the vapor blocking position, in which they are supported by the stop pins 124. In this position, the legs 121a and 121b of the yoke-like members 121 are pointing downwardly. When the rotary solenoid is shifted to the other position, the yoke-like members are adapted to engage the portion 126b of the cam 126 to return the cover plate 116 from the out-of-the-way position to the coating vapor blocking position.

Returning now to the means for rotating the vapor sources, it can be seen that the stationary sleeve 53 is mounted in a ball bearing assembly 161 mounted in a large sleeve 162 and held in place by a snap ring 163. A thrust bearing assembly 164 and a radial bearing assembly 166 are mounted on the upper end of the stationary sleeve 53 and upon the upper end of the large sleeve 162. The thrust bearing 164 is held in place by a snap ring 167, whereas the radial bearing 166 is held in place by a snap ring 168. A large retaining ring 169 is also mounted upon the stationary sleeve 53 above the bearings 164 and 166 and is secured to the rotatable large sleeve 162 by cap screws 171. Suitable sealing means in the form of a felt sealing member 172 is provided in the retaining ring 169.

Means is provided for rotating the large sleeve 162 and consists of a pulley 174 which is keyed to the upper end of the large sleeve 162 by a key 176. The pulley 174 is provided with teeth 178 which are engaged by a timing belt 179. The timing belt 179 is driven by a pulley 181. The pulley 181 is driven by a speed reducer 182. The speed reducer 182 is driven by an electric motor 183 as shown particularly in FIGURE 1.

A large sleeve 186 of a suitable material such as steel is keyed to the lower portion of the sleeve 162 by a key 187. A sleeve 188 of a suitable insulating material such as an epoxy is threaded onto the large sleeve 186 and is held in place by a lock ring 189 threaded onto the sleeve 186. A snap ring 190 is provided for locking the sleeve 186 in place.

Figure 2B:
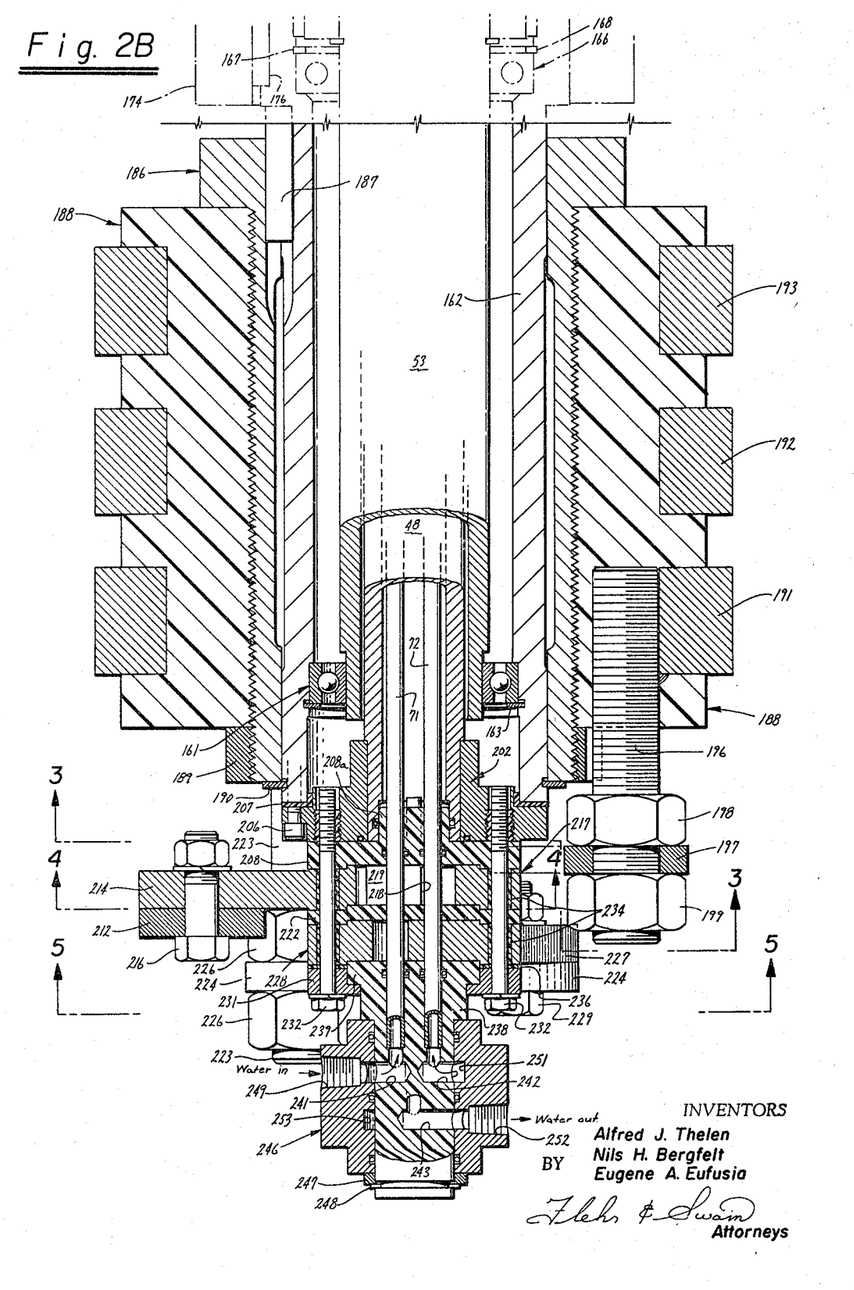
Figure 3:
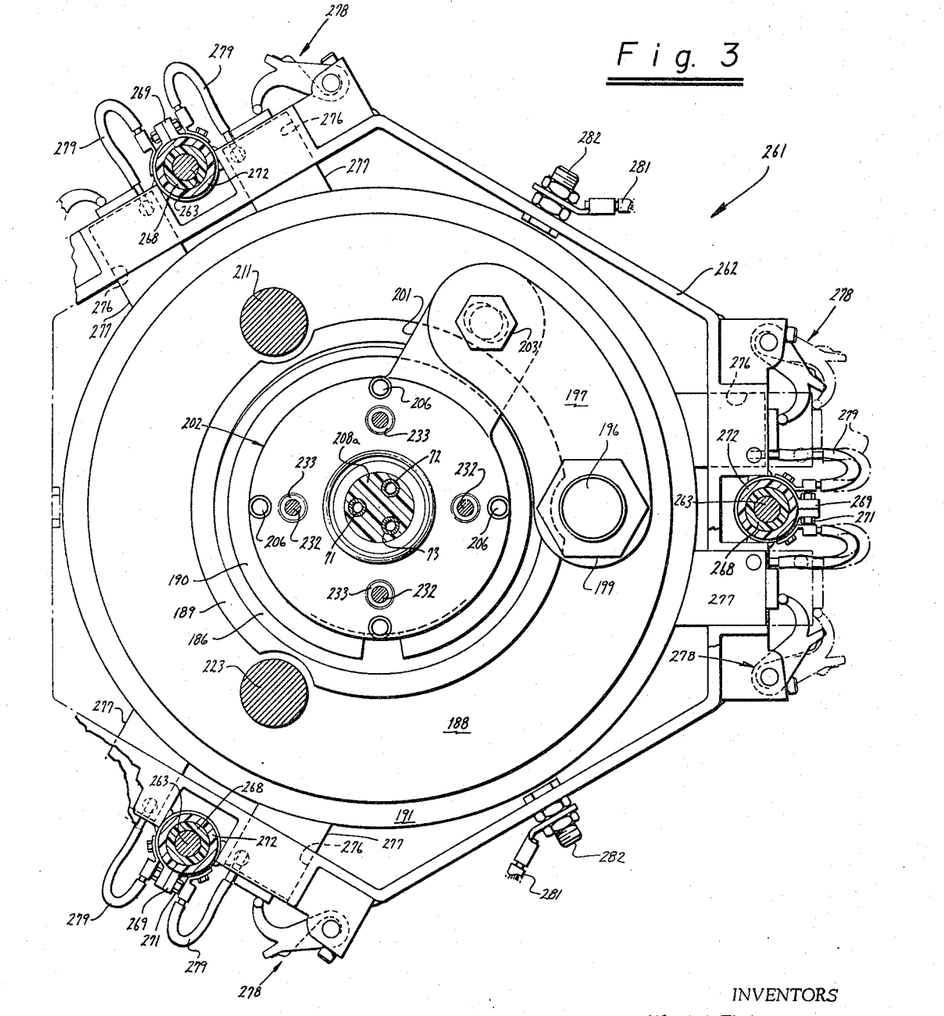
FIGURE 3 is a cross-sectional view taken along the line 3—3 of FIGURE 2B.
Figure 4:
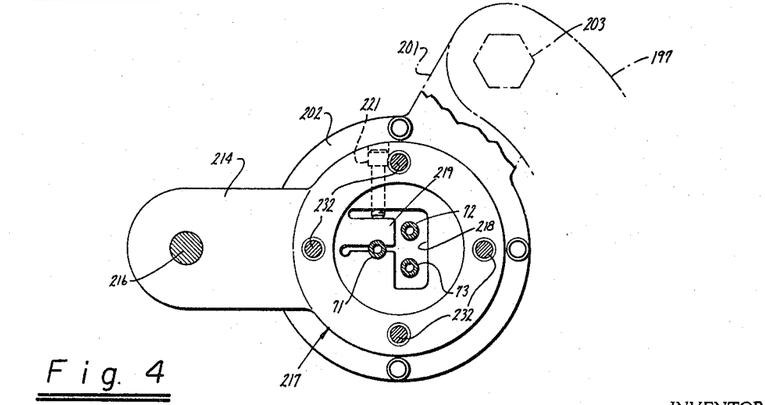
FIGURE 4 is a cross-sectional view taken along the line 4—4 of FIGURE 2B.
Figure 5:
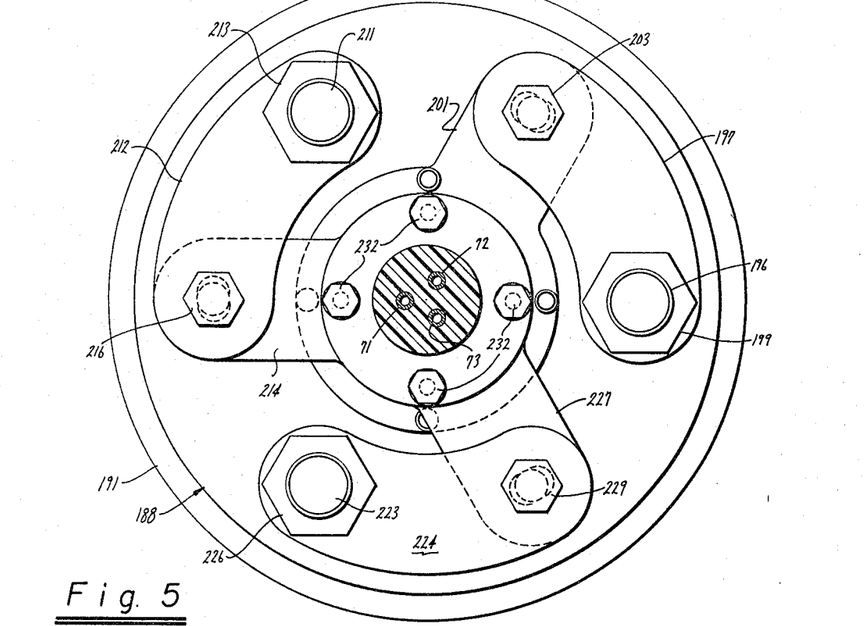
FIGURE 5 is a cross-sectional view taken along the line 5—5 of FIGURE 2B.

Three spaced parallel slip rings 191, 192 and 193 formed of a suitable conducting material such as copper are mounted in the insulating sleeve 188 for conducting electrical energy as hereinafter described. The slip ring 191 is connected to a large threaded stud 196 which is threaded into the sleeve 188 and extends downwardly therefrom. The large copper stud 196 is connected to a connector 197 which is held in place by two large nuts 198 and 199 provided on the stud 196. The connector 197 is connected to an ear 201 of a clamping member 202 by a bolt 203. The clamping member 202 is similar to those hereinafter described and is clamped to the tubing 73 to form an electrical connection therewith. The member 202 is also mounted on the lower end of the sleeve 48 and is also secured to the lower end of the large sleeve 162 by cap screws 206. An insulating ring 207 serves to insulate the member 202 from the large sleeve 162. A large insulating ring 208 is disposed below the member 202 and has an inner hub portion 208a which extends upwardly into the shaft 48. Suitable seals are provided as shown in FIGURE 2B.

Another large threaded stud 211 is threaded upwardly into the insulating sleeve 188 and makes electrical contact with the slip ring 192. A connector 212 is secured thereto by nuts 213. The connector 212 is connected to an ear 214 by a bolt 216. The ear 214 forms a part of a clamping member 217. The clamping member 217 is provided with a rectangular cut-out 218 to accommodate two of the tubes 72 and 73. The clamping member 217 is also provided with a tongue 219 which is adapted to be urged by a cap screw 221 to firmly clamp the tube 71 into the clamping member so that good electrical contact is made with the clamping member 217. An insulating ring 222 is provided below the clamping member 217.

In a similar manner, a threaded stud 223 extends upwardly into the insulating sleeve 188 and contacts the slip ring 193. A connector 224 is secured to the stud 223 by nuts 226. The connector 224 is connected to an ear 227 of a clamping member 228 by a bolt 229. The clamping member 228 is secured to the tubing 72 in a manner similar to that hereinbefore described for the other clamping members.

The clamping members 202, 217 and 228, together with the insulating rings 207, 208 and 222 are secured into a unitary assembly by a clamping ring 231 and by large cap screws 232 which extend upwardly through the clamping ring and which are threaded into insulating members 233 provided in the clamping member 202 secured to the shaft 48. The cap screws 232 are also insulated from the clamping members 217 and 228 by insulating sleeves 234 and the clamping ring 231 is insulated from the clamping member 228 by an insulating ring 236.

A body 238 formed of insulating material having a flange 239 is carried by the clamping ring 231. The body is provided with flow passages 241, 242 and 243 which are in communication with the lower extremities of the pipes or tubes 71, 72 and 73, respectively, and which are mounted therein. A union 246 of suitable material such as steel is rotatably mounted upon the lower extremity of the insulating body 238 and is secured thereto by a wear ring 247 that is held in place by a snap ring 248. The union 246 is provided with an inlet 249 which is adapted to receive a suitable cooling fluid such as water. The inlet 249 opens into an annulus 251 which is in communication with the passages 241 and 242. The union 246 is also provided with an outlet 252 which opens into an annular passage 253 in the union. The passage 253 is in registration with the passage 243 provided in the insulating body 238. A fitting 254 is mounted in the inlet 249 and is connected to piping 256. Similarly, a fitting 257 is mounted in the outlet 258 and is connected to piping 258.

Means is provided for supplying power to the slip rings 191, 192 and 193 and consists of a brush holder assembly 261. The brush holder assembly 261 is comprised of three spaced parallel hexagonal holding members 262 which are in alignment with the slip rings 191, 192 and 193. The holding members 262 are supported by three rods 263 which are secured to U-shaped angle members 264 mounted on the bottom of the chamber 12 (see FIGURE 1) and secured thereto by nuts 266. The rods 263 are threaded into rods 268 formed of a suitable insulating material such as a phenolic resin and which extend down through clamping rings 269 formed as an integral part of the holding members 262. The clamping rings 269 are secured to the rod 268 by the bolts 271. Spacers 272, also of a suitable insulating material such as a phenolic resin, are provided on the rods 268 between the holding members 262 to maintain the desired spacing between the holding members 262. Each of the holding members 262 is provided with three pairs of spaced openings 276 which are adapted to receive carbon brushes 277 that engage the slip ring opposite thereto. Means is provided for yieldably urging the brushes 277 into engagement with the slip ring and consists of a spring-urged holding member 278 pivotally mounted upon the holding member 262. Leads 279 connect the brushes to the holding member 262. Power is supplied to each of the holding members 262 by cables 281 which are connected by bolts 282 to three separate points on each of the holding members 262. The power is supplied to cables 281 from a suitable step-down transformer (not shown).

Operation and use of the vacuum coating apparatus utilizing rotating sources may now be briefly described as follows. Let it be assumed that it is desired to coat a plurality of substrates with a number of layers of two different types of materials. When such is the case, the substrates are first mounted upon the rack 31 carried by the sliding door 17. After the substrates have been suitably mounted upon the rack, and after the two materials with which it is desired to coat the substrates have been placed in the boats 40, the door 17 can be closed and the chamber evacuated. Water can then be supplied to the rotating source assembly through the tube 265. The water then passes through the inlet 249 and into the passages 241 and 242 and up through the pipes 71 and 72. The water then flows in opposite directions through the pipes 77 and through the block 111, the block 106, through the return tube 92, and down through the tubing 73 into the outlet passage 243, into the outlet piping 258.

The rotary solenoid 141 is then set so that the cam member 126 is positioned within the chamber 11 so that when the arms 42 are rotated, the cover plates or shields 116 will be moved into positions overlying the boats 40 so as to shield the substrates from any vapors emanating from the material during the time that the source material is being heated. Thereafter, the motor 181 may be placed in operation to start rotation of the boats 40 carried by the arms 42. As explained previously, this rotation is accomplished by the timing belt 179 which drives the large pulley 174. This large pulley 174 drives the sleeve 162. This large sleeve 162 carries with it the slip rings 191, 192 and 193, as well as the inner sleeve 48 and other associated parts. As the sleeve 48 rotates, it carries with it the arms 42 and the boats 40 mounted thereon.

Power can then be supplied to the coating machine to heat the boats. The upper slip ring 193 is connected to one of the boats, whereas the intermediate slip ring is connected to the other boat and the other slip ring serves as a common return for both boats. As hereinbefore explained, the slip rings are connected to the tubes 71, 72 and 73. These tubes are insulated from the other parts and the supply power to the boats 40. The boats 40 are heated because the blocks 94 and 106 are insulated from each other so that the boats form the only conducting path between the blocks. Since the boats are formed of a relatively high resistance material in comparison to the other parts of the conducting circuit, the boats are rapidly heated to heat the source material contained therein. The tubes 71, 72 and 73 are able to carry large amounts of power because they are water-cooled.

As soon as the boat containing the source material with which it is desired to place a layer upon the substrates has been heated to the desired temperature, the rotary solenoid 141 is actuated to move the cam member 126 to the position shown in the drawings so that the cover plates or shields 116 are shifted from a position overlying the source material to an out-of-the-way position to permit the vapors emanating from the source material to stream upwardly and to be deposited upon the substrates carried by the rack 31. Because the source material is being rotated continuously, a very uniform layer of the coating material will be deposited upon all the substrates. As soon as a layer of sufficient thickness has been deposited upon the substrates, the rotary solenoid 141 is again actuated so that the shield 116 is shifted from an out-of-the-way position to a position overlying the coating material to prevent further material from being deposited upon the substrates. The supply of power to the boat 40 is also terminated.

The same procedure can be followed in heating the other source to deposit a layer from the other source material. Then, thereafter, the first source can again be heated to deposit a layer of that source material upon the substrates. This procedure can be continued until the desired number of layers has been deposited upon the substrates. After the desired number of layers has been deposited, the power supply to the boats can be interrupted and the flow of the cooling water through the rotating sources can be also be stopped. The motor 183 can also be de-energized to stop rotation of the boats 40. The door 17 can then be opened and the substrates removed. The next batch of substrates can then be placed upon the rack 31 and the same procedure followed as hereinbefore described.

The above described vacuum coating apparatus utilizing rotating sources has a number of advantages. One of the principal advantages is that it is possible to utilize a stationary rack. With such a rack, it is unnecessary to clamp down the substrates which are being coated. This also eliminates chatter or the like which would be introduced if the rack were rotated. By rotating the source of the coating material, it is possible to achieve great uniformity in the coating of the substrates. In addition, by rotating the sources, it is possible to utilize the complete cross-sectional area of the coating apparatus. Thus, for example, with a machine which is rectangular in cross-section, it is possible to utilize a greater area than in the case where it was necessary to rotate the rack carrying the substrates.

With the apparatus described above, it has been found that it is possible to supply all the power required for heating the boats and the source material contained by the boats. By way of example, it was found that there was no difficulty in supplying from 1,000 to 1,500 amperes to the boats in voltages ranging from 4 to 20 volts. In this same machine, thet two boats were spaced 28 inches apart. With such a spacing, it was found that a speed of approximately 40 revolutions per minute was a practical limit in the speed. However, it should be appreciated that any desired speed can be utilized and that normally it would be desirable to utilize as fast a speed as possible. However, the practical speed is limited because of the effect of centrifugal force on the molten coating material carried in the boats. In order to have optimum deposition during operation of the coating apparatus, it is normally desirable that the coating material be flush with the top surface of the boat. This tends to limit the maximum speed of rotation for the boats which is limited by the coating material spilling from the boats while it is in a molten state when there is rotation at a greater speed.

Although boats which have been shown in the drawings are heated directly by electricity passing through the boats, it is readily apparent that, if desired, other means can be utilized for heating the boats. For example, ceramic crucibles can be utilized which are heated by resistance elements. The ceramic crucibles then can be utilized for vaporizing the coating material by introducing the heat by radiation.

It is apparent from the foregoing that we have provided new and improved vacuum coating apparatus which makes it possible to coat substrates with optimum coatings having great uniformity utilizing rotating sources.

We claim:

1. In a vacuum coating apparatus, a vacuum chamber, a rack mounted within the chamber and adapted to carry the substrates to be coated, at least one source of coating material mounted in the chamber, means for rotating the source of coating material, means for supplying heat to the source of coating material while it is being rotated, shielding means mounted on the means for rotating the source and moving with the source, said shielding means being movable between a position in which it is disposed between the source and the rack and an out-of-the-way position, and means for shifting said shielding means between said positions.

2. An apparatus as in claim 1 wherein the heat is supplied to the source of coating material through conducting members together with means for supplying a cooling fluid to the conducting members.

3. Apparatus as in claim 1 wherein said means for shifting the shielding means includes a movable member mounted on the chamber movable between first and second positions and means carried by the shielding means and engageable with said movable member in one of said first and second positions as the shielding means is rotated with the source for shifting said shielding means to one of its positions.

4. In a vacuum coating apparatus, a vacuum chamber, a rack mounted within the chamber, a rotatable member mounted in the chamber, arm means carried by the rotatable member, a pair of sources of coating material mounted upon the arm means on opposite sides of the center of rotation for the arm means, means mounted exterior of the chamber for rotating the rotatable member, means for supplying power to the sources of coating material to raise the temperature of the same to thereby cause vapors to emanate therefrom and to be deposited upon the substrates as the source of material is rotated and a shielding member for each of said sources mounted upon the arm means for rotational movement with the arm means and movable from a position disposed between the associated source of coating material and the substrates and an out-of-the-way position.

5. Apparatus as in claim 4 together with remotely controlled means for moving the shielding members between said positions while the arm means is rotating.

6. In a coating apparatus, a vacuum chamber, a rack mounted within the chamber and adapted to carry a plurality of the substrates to be coated, a rotatable member mounted in the wall of the chamber, a pair of arms mounted upon the rotatable member and being rotatable therewith, means mounted on each of the arms adapted to carry source material, means mounted outside the chamber for rotating said rotatable member, means for supplying electrical energy to the means for carrying the source material to heat the same while they are being rotated and a shielding member mounted on each of the arms for movement with the arms, each of said shielding members being movable between a position between the source of material and the substrates to be coated and an out-of-the-way position.

7. Apparatus as in claim 6 wherein means for supplying electrical power to the means for carrying the source material comprises slip ring means carried by the rotatable member, connecting means connecting the slip ring means to the means mounted on the arms for carrying the source material, and brush means engaging the slip rings for supplying power to the slip rings.

8. Apparatus as in claim 7 wherein said means connecting said slip ring means to said means for carrying the source material includes conducting tubes connected to the sources together with means for supplying a cooling fluid to the conducting tubes.

9. Apparatus as in claim 6 together with remotely operated means carried by the vacuum chamber for shifting said shielding members between said two positions and being operable during rotation of the arms.

10. Apparatus as in claim 9 wherein said remotely operated means includes a member movable between first and second positions and wherein each of the said shielding members includes means engageable with said movable member in one of said first or second positions as the shielding member is rotated with the arm for shifting the shielding member to one of its positions.

References Cited

UNITED STATES PATENTS

| | | | |
|---|---|---|---|
| 2,341,827 | 2/1944 | Sukumlyn | 118—49 X |
| 2,351,537 | 6/1944 | Osterberg et al. | 118—49 |
| 2,378,476 | 6/1945 | Guellich | 118—49 |
| 2,435,997 | 2/1948 | Bennett | 118—49 |
| 2,469,929 | 5/1949 | Osterberg et al. | 118—49 X |
| 2,475,854 | 7/1949 | Ogle | 118—49 |
| 2,745,773 | 5/1956 | Weimer | 118—49 X |
| 3,131,917 | 5/1964 | Gessner et al. | 118—500 X |
| 3,211,128 | 10/1965 | Potter et al. | 118—49.1 |
| 3,263,648 | 8/1966 | Chapman et al. | 118—49.1 |

MORRIS KAPLAN, *Primary Examiner.*